United States Patent [19]

D'Arrigo et al.

[11] 4,146,753
[45] Mar. 27, 1979

[54] TRANSMIT/RECEIVE NETWORK FOR TELEPHONE-SUBSCRIBER STATION

[75] Inventors: Sebastiano D'Arrigo, Sedriano; Antonio Neri, Montevarchi, both of Italy

[73] Assignees: CSELT - Centro Studi e Laboratori Telecomunicazioni S.p.A., Turin; SGS ATES - Componenti Elettronici S.p.A., Agrate Brianza, both of Italy

[21] Appl. No.: 856,676

[22] Filed: Dec. 1, 1977

[30] Foreign Application Priority Data

Dec. 3, 1976 [IT] Italy .............................. 30050 A/76
Sep. 23, 1977 [IT] Italy .............................. 27860 A/77

[51] Int. Cl.² .......................................... H04M 1/58
[52] U.S. Cl. .............................. 179/81 A; 179/170 T
[58] Field of Search .............. 179/81 A, 81 R, 81 B, 179/170 NC, 170 D, 170 T

[56] References Cited

U.S. PATENT DOCUMENTS

| | | | |
|---|---|---|---|
| 3,546,395 | 12/1970 | Schuh | 179/81 A |
| 3,582,564 | 6/1971 | Knauer | 179/81 A |
| 3,708,630 | 1/1973 | Matsuda et al. | 179/81 A |
| 3,711,660 | 1/1973 | Cherry | 179/81 A |
| 3,742,153 | 6/1973 | Matsuda et al. | 179/81 A |
| 3,748,400 | 7/1973 | Ritz et al. | 179/81 A |
| 3,974,344 | 8/1976 | Mersich | 179/81 A |
| 4,031,331 | 6/1977 | Sencer | 179/81 A |
| 4,071,713 | 1/1978 | Sencer | 179/81 A |

Primary Examiner—Kathleen H. Claffy
Assistant Examiner—Gerald L. Brigance
Attorney, Agent, or Firm—Karl F. Ross

[57] ABSTRACT

A receiving amplifier AR and a transmitting amplifier AT at a telephone-subscriber station have operating circuits in respective diagonals A-D and B-C of a bridge circuit whose four impedance arms are formed by two fixed resistances $Z_1$, $Z_2$, a variable resistance $Z_3$ and the resistance $Z_4$ of a line linking the subscriber station with an associated central office. The variable bridge resistance $Z_3$ includes a plurality of resistors selectively insertable under the control of a voltage sensor and stabilizer SL connected across the transmitting diagonal B-C which also biases a variable-gain input stage of each amplifier AR, AT to adapt it to the line resistance. A final stage of the transmitting amplifier AT has an input connected via a negative-feedback resistance ZA to one of its output terminals whereby the effective resistance of this amplifier is reduced to a small fraction of the two bridge resistances $Z_1$, $Z_3$ in parallel therewith. A microphone M and an earpiece RC, respectively connected to the input of the transmitting amplifier AT and to the output of the receiving amplifier AR, may be constituted by identical electro-acoustic transducers. A tone generator DS, serving for the emission of call-number digits, can be energized from the sensor SL and has an output which blocks the input stage of the transmitting amplifier during such emission.

12 Claims, 5 Drawing Figures

TRANSMIT/RECEIVE NETWORK FOR TELEPHONE-SUBSCRIBER STATION

FIELD OF THE INVENTION

Our present invention relates to a transmit/receive network of a telephone-subscriber station connected via a two-wire line to an associated central office or exchange.

BACKGROUND OF THE INVENTION

In telephone systems it is customary to connect the voice-receiving and voice-transmitting devices of a subscriber station, such as an earpiece and a microphone, in mutually conjugate relationship to the associated line with the aid of a coupling network of the inductive type, known as a hybrid coil. A disadvantage of such inductive couplers is their limited ability to suppress the so-called local effect, i.e. the echoing of a speaker's voice into his own receiver. Another drawback is the need for using high-resistance transmitting devices, such as carbon microphones, which are sensitive to ambient temperatures and tend to deteriorate with age. The need for providing and servicing different types of electro-acoustic transducers for reception and transmission is a further inconvenience.

It is also known in telephone systems to couple two mutually conjugate two-wire lines with a common two-wire line, either at a subscriber station or at a central office, via a predominantly resistive bridge circuit having the two conjugate lines connected across respective diagonals thereof, one of the four impedance arms of the bridge being constituted by the resistance of the common line which the other three arms consist of fixed resistors. If the line resistance does not vary significantly, the three fixed resistors can be readily dimensioned to balance the bridge for proper decoupling of the two conjugate lines (i.e. the local transmitting and receiving circuits) from each other. Since, however, the resistance of a subscriber line depends upon its effective length, that parameter is subject to change, e.g. upon extension of the line of a calling subscriber to a called subscriber by the central office.

OBJECTS OF THE INVENTION

The general object of our present invention is to provide an improved transmit/receive network for a telephone-subscriber station which is self-accommodating to different line resistances.

Another object is to provide a network of this type which, while obviating the aforestated disadvantages, enables the use of identical transducers for both transmission and reception.

A more particular object is to provide means in such a network facilitating its use with a digital selector of the multi-tone type.

SUMMARY OF THE INVENTION

The voice-receiving and voice-transmitting devices of a subscriber station embodying our invention include respective amplifiers with operating circuits inserted in respective diagonals of a predominantly resistive bridge circuit having one of its impedance arms constituted by the resistance of a two-wire line extending to the associated central office or exchange, that line having a pair of terminals forming a first and a second corner or junction point of the bridge. A fixed resistance, forming a second impedance arm, lies between the first and a third corner, the transmitting diagonal being defined by the second and third corners. Two other resistances, in parallel with this transmitting diagonal, meet at a fourth corner which together with the first corner defines the receiving diagonal. At least one of these two other resistances, preferably the one lying between the second and fourth bridge corners, is adjustable to balance the line resistance.

According to an important feature of our invention, the operating circuit of the transmitting amplifier (lying between the second and third bridge corners) has an effective resistance which is low compared with the combined magnitude of the two resistances meeting at the fourth corner whereby the bridge resistance as seen from the line consists essentially of the sum of this amplifier resistance and the (advantageously considerably larger) fixed resistance adjoining the first corner. This bridge resistance, accordingly, is virtually independent of the setting of the variable resistance or resistances serving to balance the bridge; its magnitude, therefore, can be chosen so as to represent an optimum line termination for signals arriving from the central office.

Pursuant to another important feature of our invention, the adjustment of the variable bridge-balancing resistance (or resistances) is accomplished by switch means controlled from a voltage sensor which is connected across the transmitting diagonal, i.e. between the second and third bridge corners. Though this variable resistance could be a potentiometer, with a slider displaceable by the switch means, a simpler arrangement sufficient in most instances includes a limited number of fixed resistors selectively connectable in various parallel combinations.

The voltage sensor sdvantageously also acts as a voltage stabilizer, comprising for this purpose a constant-voltage device drawing a line current which varies inversely with the line resistance so as to maintain a substantially constant voltage drop across the transmitting diagonal. Thus, the magnitude of that current is a measure of the line resistance and can therefore be utilized to control the bridge-balancing switch means. A portion of the variable line current traversing the sensor can also be used to modify the gain of the transmitting and receiving amplifiers to compensate for changes in the line resistance. Moreover, the voltage-stabilizing sensor serves as a source of constant current which may provide a supplemental bias for the amplifiers and may also energize ancillary equipment such as a multifrequency tone generator used for the emission of call digits.

In accordance with a further feature of our invention, the transmitting amplifier is provided with a negative-feedback circuit reducing its output resistance, i.e. the effective resistance of the operating circuit connected across the transmitting diagonal. This feedback, together with the fact that the transmitting amplifier is energized directly from the line, increases the dynamic range of that amplifier. Advantageously, each amplifier is divided into a pilot stage and a final stage, only the final stage of the transmitting amplifier being included in the feedback loop whereby the input impedance of its pilot stage can be independently adjusted to a value properly matched to the impedance of an associated transducer acting as a microphone. By the same token, the output impedance of the final stage of the receiving amplifier can be suitably chosen to match the impedance of a similar transducer serving as an earpiece or speaker while the input impedance of its pilot stage is kept high to minimize its shunting effect upon the bridge resistance in parallel therewith. We are therefore able to select any of various types of electro-acoustic transducers (e.g. electromagnetic or piezoelectric ones) for transmission and reception, preferably in the shape of substantially identical capsules emplaceable at opposite ends of a telephone handset.

BRIEF DESCRIPTION OF THE DRAWING

The above and other features of our invention will now be described in detail with reference to the accompanying drawing in which.

SPECIFIC DESCRIPTION

Figure 1:
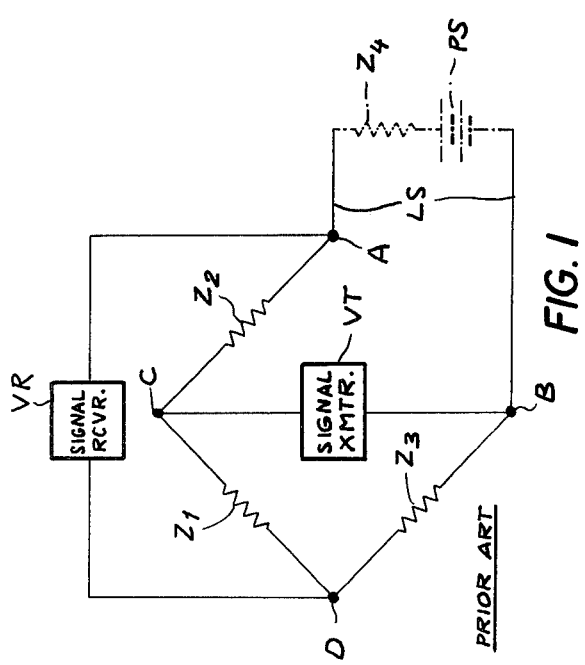
FIG. 1 is a circuit diagram of a conventional resistance bridge used in telephone systems.

Reference will first be made to FIG. 1 showing a conventional bridge circuit with four corners A, B, C, D defined by four impedance arms essentially consisting of resistances $Z_1$, $Z_2$, $Z_3$, $Z_4$. Impedance $Z_4$ is the resistance of a two-wire line LS whose terminals are the first and second bridge corners A and B, that resistance being in series with a power supply PS schematically shown as a battery. A voice-signal transmitter VT, such as a carbon microphone, lies in the bridge diagonal defined by the second and third corners B, C whereas a voice-signal receiver VR, such as an earpiece, is inserted in the diagonal defined by the first and fourth corners A, D. Impedances $Z_1$, $Z_2$ and $Z_3$ are fixed resistors intended to satisfy the relationship $Z_1Z_4 = Z_2Z_3$ which, however, will hold true only for a given line impedance $Z_4$. Thus, instability and echo effects result from significant changes in line length.

Figure 2:
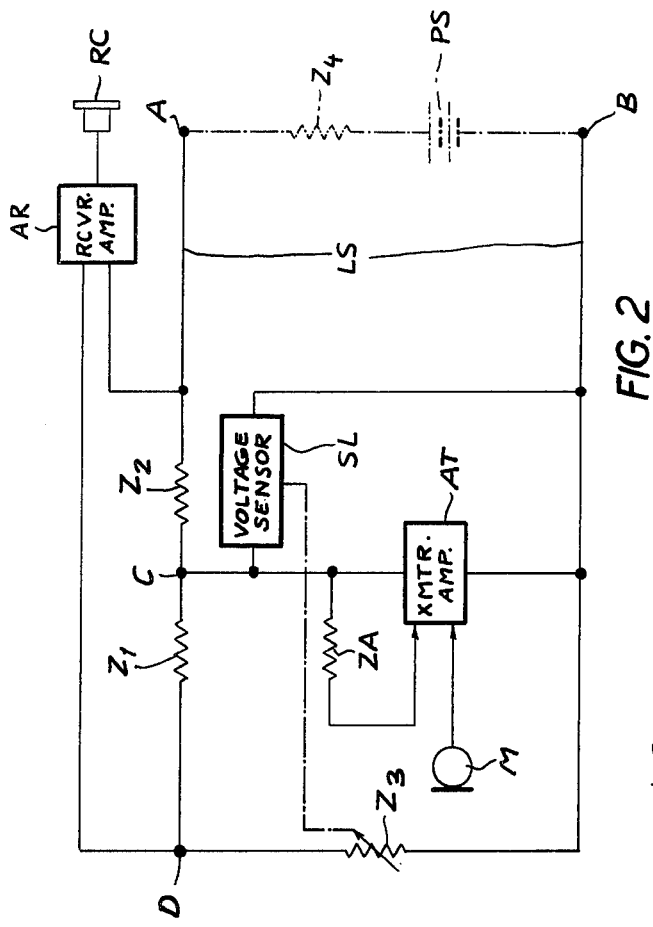
FIG. 2 is a similar diagram illustrating our present improvement.

FIG. 2 shows a bridge circuit generally similar to that of FIG. 1 as modified in accordance with our present improvement. A microphone M works into a transmitting amplifier AT whose operating circuit is inserted in the bridge diagonal B-C; the operating circuit of a receiving amplifier AR lies in the other bridge diagonal A-D, this amplifier feeding an earpiece RC. One of the impedance arms $Z_1$, $Z_3$ on the side of diagonal B-C opposite line impedance $Z_4$, here specifically the resistance $Z_3$, is adjustable under the control of a voltage sensor SL connected across junctions or bridge corners B and C, in parallel with amplifier AT; the latter is provided with a negative-feedback loop including a fixed ancillary resistor ZA inserted between one of its inputs and junction C.

The adjustability of resistance $Z_3$, under the control of sensor SL as more fully described hereinafter, serves to maintain the bridge substantially balanced in the face of changing line impedances $Z_4$, i.e. to preserve the aforementioned relationship $$Z_1Z_4 = Z_2Z_3 \quad (1)$$

which keeps the two transducer amplifiers AT, AR decoupled from each other. Impedance $Z_4$ is the resistance of the subscriber line LS, including that of any further line to which it may be connected by the exchange, and of its remote termination.

The input impedance $Z_{in}$ of the bridge, as seen from the line LS, is given by $$Z_{in} = Z_2 + Z_{at} // (Z_1 + Z_3) \quad (2)$$

where the symbol // denotes a parallel relationship; $Z_{at}$ is the effective impedance of amplifier AT and is given by $$Z_{at} = k \cdot ZA \quad (3)$$

From equations (2) and (3) it will be apparent that $Z_{in}$ is substantially independent of $(Z_1 + Z_3)$, thus of any variations in $Z_3$ made for balancing purposes, if $$k \cdot ZA << (Z_1 + Z_3) \quad (4)$$

with k a coefficient dependent on the gain and the feedback factor of amplifier AT. This coefficient, and thus the impedance $Z_{at}$ of the amplifier, varies of course with the signal fed in from microphone M; such variation, too, will have a negligible effect upon input impedance $Z_{in}$ if the series resistance $Z_2$, like the sum of resistances $Z_1$ and $Z_3$, is large compared with $k \cdot ZA$.

Thus, the effective amplifier impedance $Z_{at}$ can be selected at its optimum value for communication between the subscriber station and the central office.

Figure 3:
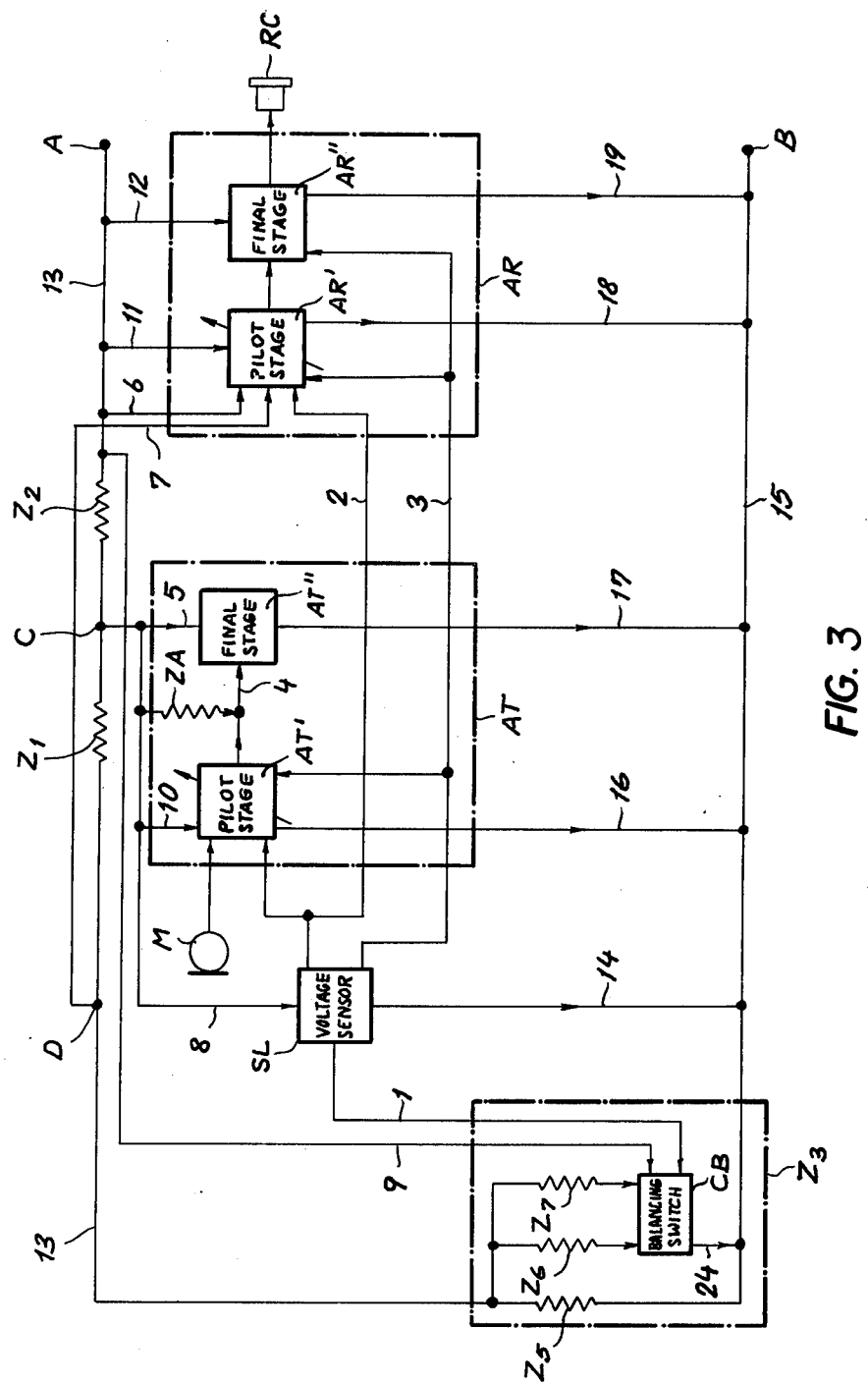
FIG. 3 is a more detailed diagram of the circuitry shown in FIG. 2.

In FIG. 3 we have shown the bridge circuit of FIG. 2 in greater detail. Transmitting amplifier AT consists of a variable-gain pilot stage AT' and a final stage AT''; analogously, receiving amplifier AR consists of a variable-gain pilot stage AR' and a final stage AR''. The operating circuit of amplifier AT, schematically represented as a single line in FIG. 2, has two parallel branches 10, 16 and 5, 17 respectively feeding the two stages AT' and AT''; similarly, the operating circuit of amplifier AR consists of two parallel branches 11, 18 and 12, 19 respectively feeding its stages AR' and AR''. These stages may be represented by transistors or transistor combinations with a plurality of inputs carrying signal and biasing currents; thus, voltage sensor SL supplies a variable biasing current to stages AT' and AR' on a lead 2 and fixed biasing current to stages AT', AR' and AR'' on a lead 3. Another output 1 of sensor SL extends to a balancing switch CB, preferably of the electronic type, serving for adjustment of resistance $Z_3$ here shown to consist of three fixed resistors $Z_5$, $Z_6$ and $Z_7$ in parallel. Resistors $Z_6$ and $Z_7$, differing in magnitude from each other, may be selectively connected across resistor $Z_5$, either individually or jointly; this provides four distinct values for bridge resistance $Z_3$. Such a number of settings will be sufficient in many instances for a substantial balancing of the bridge under various operating conditions; naturally, the number of selectively insertable resistors can be increased if necessary.

Voltage sensor SL is connected between junction points C and B by leads 8 and 14, the latter lead terminating together with leads 16-19 at a conductor 15 which is an extension of one of the wires of subscriber line LS (FIG. 2). The other line wire has an extension 13 which includes the two fixed resistors $Z_1$ and $Z_2$. Switch CB may comprise a comparator with a number of thresholds established by a reference voltage obtained from junction point A via a lead 9; the circuit is completed by a connection 24 to conductor 15. The comparator should have a sufficiently large time constant to prevent a response to voice currents generated in the output of amplifier AT.

Figure 5:
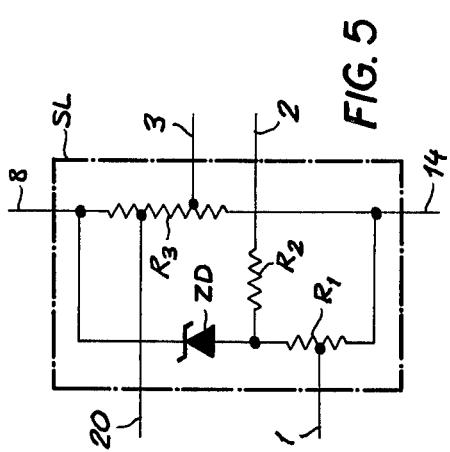
FIG. 5 shows details of a voltage sensor included in the circuitry of FIGS. 2 to 4.

An exemplary embodiment of voltage sensor SL is illustrated in FIG. 5. A constant-voltage device, represented by a Zener diode ZD, lies in series with a small resistor $R_1$ from which the control voltage on lead 1 is derived. Another small resistor $R_2$ connected to Zener diode ZD in parallel with resistor $R_1$ supplies, on lead 2, a variable biasing current for amplifier stages AT' and AR'; this current adapts the gain of stages AT' and AR' to changes in line resistance as reflected in variations of the current passed by the Zener diode. A larger resistor $R_3$, connected across the series combination of Zener diode ZD and resistor $R_1$, has a tap tied to lead 3 for supplying a supplemental biasing current of fixed magnitude to pilot stages AT', AR' as well as to final stage AR'' to establish suitable operating points for them.

Pilot stage AR' has input connections 6, 7 to junction points A and D for picking up voice signals arriving from the central office.

Voice currents generated by microphone M and amplified in pilot stage AT' are transmitted to input 4 of final stage AT'' which also receives negative-feedback signals from output lead 5 by way of ancillary resistor ZA. This degenerative feedback increases the input impedance and reduces the output impedance of amplifier stage AT'' to satisfy the relationship (4) while also widening the dynamic range of the transmitting amplifier.

In operation, a lifting of the subscriber's handset closes the usual switch hook (not shown) to energize the line terminals A and B from the central power supply PS. As the current traversing the sensor SL is a function of the line resistance $Z_4$, the voltage appearing on lead 1 proportional to that current controls the switch CB to rebalance to bridge is necessary. The biasing current fed to pilot stages AT' and AR' on lead 2 is proportional to the total current drawn by the sensor and is therefore also a function of the line impedance. A substantially constant voltage difference is maintained by the sensor SL between junction points B and C from which the amplifiers AR and AT draw their operating currents, a fractional current also traversing the resistor ZA to provide the desired low diagonal resistance $Z_{at}$. With suitable choice of resistors $Z_5$–$Z_7$, local echoes due to a residual unbalance will remain well below the noise level.

Figure 4:
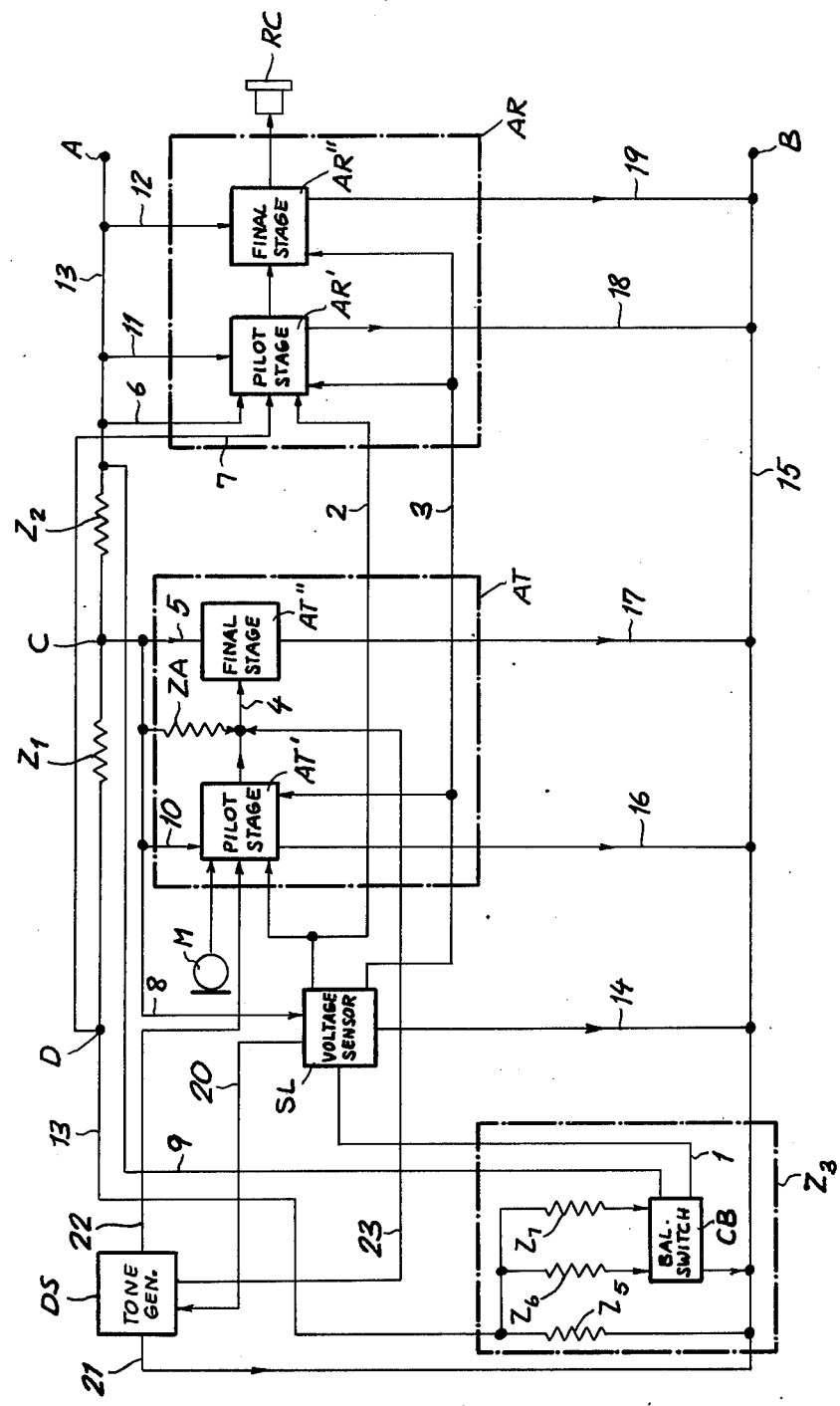
FIG. 4 is a diagram similar to that of FIG. 3, illustrating a modification.

The system just described can be used with conventional call-number selectors of various kinds, including the usual dialing disks or pushbutton-type generators of pulse trains or multi-frequency tones. Such generators must be energized by a stabilized voltage which conveniently can be derived from the sensor SL of our present system. This has been illustrated in FIG. 4 where an output lead 20 of sensor SL (see also FIG. 5) extends to a tone generator DS which is also connected to conductor 15 by a lead 21. Generator DS works into the input 4 of stage AT'' which acts as an amplifier and impedance adapter for its output.

Since voice frequencies emitted by microphone M could interfere with the production of digital signals by tone generator DS, the transmission of voice signals via amplifier AT is blocked whenever the tone generator is in operation. For this purpose we provide an inhibiting lead 22 extending to a further input of amplifier stage AT' to disable it during the establishment of a connection between a calling and a called subscriber. The characteristic energization of lead 22 during tone generation can be performed by conventional circuitry.

We claim:

1. In a telephone system wherein a subscriber station is linked by a two-wire line with a central office and is provided with voice-transmitting means and voice-receiving means coupled to said line in mutually conjugate relationship by a bridge circuit with four predominantly resistive impedance arms, one of said arms being constituted by the resistance of said line and being bounded by a first and a second corner of said bridge circuit, the improvement wherein the other three impedance arms of said bridge circuit comprise a fixed resistance between said first corner and a third corner and two further resistances serially connected between said second and third corners and joined to each other at a fourth corner to said bridge circuit, at least one of said further resistances being variable and including a plurality of resistors in parallel with one another, said voice-receiving means including a receiving amplifier with an input circuit inserted in one bridge diagonal between said first and fourthe corners, said voice-transmitting means including a transmitting amplifier with an operating circuit inserted in another bridge diagonal between said second and third corners, said operating circuit having an effective resistance which is low compared with the sum of said further resistances;

further comprising voltage-sensing means, connected across said second and third corners in parallel with said operating circuit, and switch means controlled by said voltage-sensing means for adjusting said variable resistance to maintain said bridge circuit in substantial balance with changes in the resistance of said line, said switch means being operable by said voltage-sensing means for selectively inserting said resistors in different combination in the corresponding impedance arm.

2. The improvement defined in claim 1 wherein said corresponding impedance arm lies between said second and fourth corners.

3. In a telephone system wherein a subscriber station is linked by a two-wire line with a central office and is provided with voice-transmitting means and voice-receiving means coupled to said line in mutually conjugate relationship by a bridge circuit with four impedance arms, one of said arms being constituted by the impedance of said line and being bounded by a first and a second corner of said bridge circuit, said voice-transmitting and voice-receiving means being energizable by way of said line from a remote power supply, the improvement wherein the other three impedance arms of said bridge circuit comprise a fixed impedance between said first corner and a third corner and two further impedances serially connected between said second and third corners and joined to each other at a fourth corner of said bridge circuit, at least one of said further impedances being variable, said voice-receiving means including a receiving amplifier with an input circuit inserted in one bridge diagonal between said first and fourth corners and with an operating circuit inserted between said first and second corners in parallel with said line, said voice-transmitting means including a transmitting amplifier with an operating circuit inserted in another bridge diagonal between said second and third corners, the last-mentioned operating circuit having an effective impedance which is low compared with the sum of said further impedances;

further comprising voltage-sensing means, connected across said second and third corners in parallel with said last-mentioned operating circuit, and switch means controlled by said voltage-sensing means for adjusting said variable impedance to maintain said bridge circuit in substantial balance with changes in the impedance of said line.

4. The improvement defined in claim 3 wherein said voltage-sensing means comprises a constant-voltage device provided with an output lead carrying a voltage proportional to the current drawn by said device from said line, said switch means being connected to said output lead.

5. The improvement defined in claim 3 wherein said receiving and transmitting amplifiers are provided with gain-varying control inputs connected to said voltage-sensing means for adapting the operation of said amplifiers to the line impedance.

6. The improvement defined in claim 5 wherein said receiving and transmitting amplifiers are each provided with a pilot stage and a final stage each inserted in a respective branch of the corresponding operating circuit, said voltage-sensing means being provided with an output connection supplying a variable biasing current dependent upon line resistance to said pilot stage of each of said amplifiers.

7. The improvement defined in claim 6 wherein said voltage-sensing means is provided with another output connection supplying a constant biasing current to the pilot stage of each of said amplifiers and to the final stage of said receiving amplifier.

8. The improvement defined in claim 6 wherein the final stage of said transmitting amplifier is provided with a negative-feedback connection from one of the corners of said output diagonal for lowering said effective impedance.

9. The improvement defined in claim 8 wherein said feedback connection includes an ancillary resistance inserted between said third corner and an input of said final stage of said transmitting amplifier.

10. The improvement defined in claim 3 wherein said station is provided with digital selection means including a multifrequency tone generator connected across said line, said voltage-sensing means having an output extending to said tone generator for supplying operating energy thereto.

11. The combination defined in claim 10 wherein said tone generator is provided with an inhibiting lead extending to said transmitting amplifier for blocking same during emisssion of selection signals.

12. The combination defined in claim 3 wherein said voice-receiving means and said voice-transmitting means comprise a pair of substantially identical electroacoustic transducers respectively connected to an output of said receiving amplifier and to an input of said transmitting amplifier.

* * * * *